Sept. 4, 1956  J. H. WERNIG  2,761,728
SEALING MEANS FOR DOORS
Filed Oct. 29, 1952

INVENTOR
James H. Wernig
BY
Willits, Helwig & Caillo
ATTORNEYS

United States Patent Office 2,761,728
Patented Sept. 4, 1956

2,761,728

SEALING MEANS FOR DOORS

James H. Wernig, Bloomfield Village, Mich., assignor to General Motors Corporation, Detroit, Mich., a corporation of Delaware Application October 29, 1952, Serial No. 317,440

9 Claims. (Cl. 296—44)

This invention relates to sealing means for doors, and more particularly to an improved weatherstrip for automobile doors.

Because of the relatively high sealing pressure which is desired in sealing automobile doors a simple compressible weatherstrip on the door is not practical because with such a weatherstrip the door is too hard to close and the latch is too hard to operate in order to open the door. For this reason weatherstrips which seal by deflection of a resilient portion are preferred over weatherstrips which seal by compression of a resilient portion. However, when deflection type weatherstrips have been used in the past, it has been necessary either to sacrifice sealing pressure or to provide complex weatherstrips having molded portions of varying cross-sectional shape at different parts of the periphery of the door. Such specially molded weatherstrip sections are expensive to manufacture and are difficult and expensive to mount on the door.

The invention provides an improved weatherstrip which may have a constant transverse sectional configuration throughout its entire length so that the weatherstrip, which extends entirely around the door, may comprise a single integral molded piece despite the fact that the sealing force is exerted in different directions along different sides of the door when the door is closed. The improved weatherstrip has a resilient lip which is deflected entirely around the periphery of the door when the door is closed, although in certain areas a slight compression of the weatherstrip may be employed during the last increment of door closing. This compression action, however, occurs after at least a partial seal is obtained by deflection, and furthermore, the areas where compression is employed are adjacent the hinging axis of the door so that a high leverage ratio is obtained and the slight compression does not result in difficult door closing or door opening.

The improved weatherstrip is asymmetrically formed so that the resilient sealing portion will always be deflected in a given direction when the door is closed, the asymmetrical configuration making it impossible for the weatherstrip to be compressed by initial pressure exerted on the resilient portion of the weatherstrip when the door is closed. The weatherstrip has a resilient base and an integral asymmetrical lip projecting from the base. A tapered flange forms part of the base and projects therefrom at one side of the lip, one surface of the flange merging with the lip at the side thereof. The lip is formed so that its sides lean toward the flange so that force exerted on the free end of the lip in a direction toward the base of the weatherstrip will not compress the lip, but will deflect it toward the flange.

Deflection of the resilient lip results in a lever action tending to tear the base of the weatherstrip loose from the surface on which it is mounted. The projecting flange, which preferably is wider than the lip, provides a large surface area for attachment to the door, and extensive tests have shown that the asymmetrical conformation of the weatherstrip, providing a large attaching surface area, very effectively prevents the weatherstrip from tearing loose.

In addition, the flange preferably projects from the base at substantially a right angle to the lip to form a depressed center portion in the undersurface of the weatherstrip base so that when the base is cemented to a substantially flat surface the flange is deflected and is therefore resiliently biased into engagement with said surface to ensure a good cemented bond between the flange and said surface.

Other features and advantages of the invention will appear from the following description and from the drawings, in which.

Referring now more particularly to the drawings, an automobile designated generally as 10 has front and rear door frames within which are mounted front and rear doors 11 and 12. Each door is hinged along its front edge so that the doors open from the rear. The concealed hinges are shown diagrammatically at 14 in Figure 1.

The door frame is of conventional construction and comprises vertical pillars at the front and rear edges of each door and top and bottom sill members of conventional construction.

Figure 1:
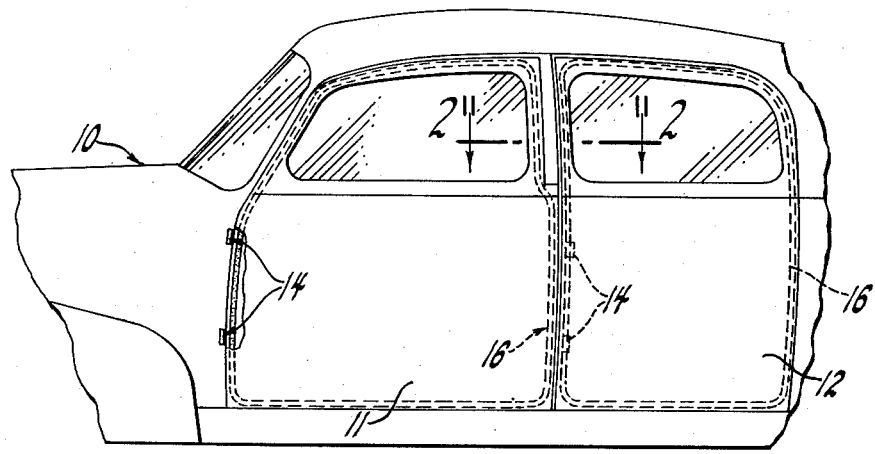
Figure 1 is a fragmentary side view of an automobile having the improved weatherstrip mounted thereon.

As shown diagrammatically in Figure 1, a flexible weatherstrip designated generally as 16 extends entirely around the periphery of each door, this weatherstrip being of constant transverse sectional configuration throughout its entire length.

Figure 2:
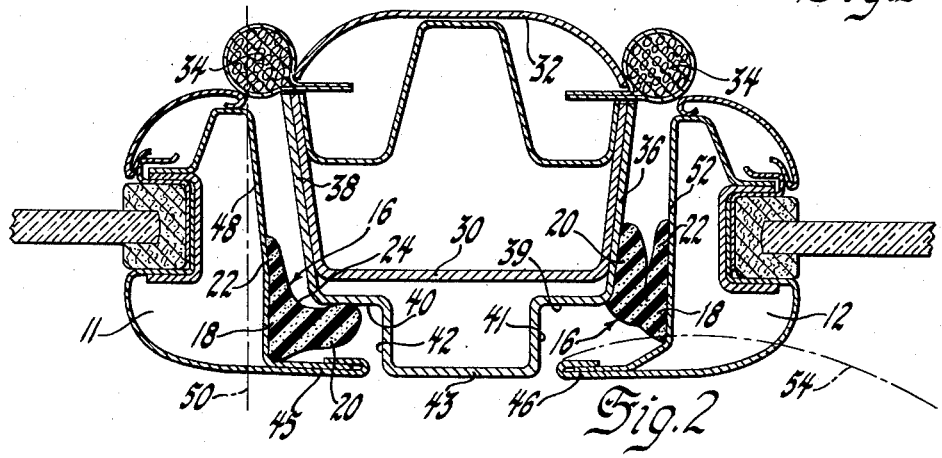
Figure 2 is an enlarged transverse sectional view taken along the line 2—2 of Figure 1.
Figure 3:
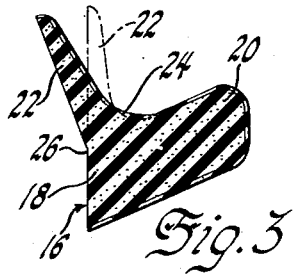
Figure 3 is a further enlarged transverse section through a weatherstrip generally similar to the weatherstrip shown in Figure 2, but having a deflecting lip of somewhat different shape.

As shown best in Figures 2 and 3, the weatherstrip comprises a base portion 18 having an integral asymmetrical lip 20 projecting therefrom. A tapered flange 22 forms part of the base and projects from the base portion 18 at one side of the lip 20, one surface of the flange merging with the lip at said side thereof, as indicated at 24.

As shown in Figure 3, when the weatherstrip is unstressed the flange 22 projects from the base 18 at an angle to form a depressed center portion 26 in the undersurface of the base of the weatherstrip. Preferably the weatherstrip is so formed that the angle between the flange 22 and the lip 20 is substantially a right angle when the weatherstrip is unstressed, and when the undersurface of the weatherstrip is cemented or otherwise sealed to a generally plane surface the merging portion 24 between one side of the lip 20 and the flange 22 will be flexed.

Figure 2 is a typical section which shows two conditions of deflection of the weatherstrip when it is mounted on an automobile door. One of these two conditions pertains at any point around either the front or rear door. In Figure 2 a portion of the door frame is formed by a center door pillar having an internal structural member 30 which is U-shaped in transverse section and which carries an inner surface member 32, sealing beads 34 being provided at either side of the door opening at the inside of the automobile in conventional manner. The exterior surface of the door pillar is provided by a channel shaped member having opposite side walls 36 and 38 each formed with a rabbeted portion providing outwardly facing surfaces 39 and 40 and side surfaces 41 and 42 which are joined by the outwardly facing base 43 of the channel member.

The front door 11 has a peripheral pinch-weld flange 45, and the rear door 12 has a similar pinch-weld flange 46, these flanges lying generally in the plane of the base 43 of the pillar member to provide a trim appearance on the outside of the automobile.

The front door 11 has a side wall 48 upon which the weatherstrip 16 is mounted with the base flange 22 of said weatherstrip extending toward the inside surface of the door. As pointed out above, Figure 2 is a typical section and the construction around the entire periphery of the front door is quite similar to the construction shown in the left part of Figure 2, differing principally in the rabbeted portion, which may vary in depth. The broken line 50 designates the swing line of the rear edge of the front door, and it will be noted that the direction of swing is such that the side surface of the resilient lip 20 engages the outwardly facing surface 40 provided by the rabbeted portion of the door pillar so that the lip 20 is deflected from its free position by said outwardly facing surface 40. The seal is thus made completely by deflection of the lip 20, and there is no compression whatsoever of the weatherstrip where the condition illustrated in the left portion of Figure 2 obtains.

The weatherstrip preferably is made of a single piece of resilient material, sponge rubber being preferred. The deflection of the resilient lip 20 from its free or unstressed position creates a leverage action with force tending to tear the weatherstrip loose from the door surface upon which it is cemented or otherwise mounted, but it will be noted that the initial deformation of the weatherstrip illustrated in Figure 3 tends to alleviate this force to prevent the flange portion 22 of the weatherstrip from tearing loose. In addition, the provision of an asymmetrical weatherstrip having a relatively large area provided by flange 22 extending outwardly from the side of the weatherstrip gives a much larger cementing area in the region where the leverage forces are exerted than is normally found in door weatherstrips, particularly in symmetrically formed weatherstrips having a sealing lip projecting from the center of the base portion. The weatherstrip shown herein has been subjected to extensive tests and it has been found that it does not tear loose from its supporting surface even after many thousands of closing operations.

Referring to Figure 1, it will be seen that the condition illustrated in the left portion of Figure 2 occurs throughout the entire rear side of the front door and also along the top and the bottom of the door. Conventionally automobile front doors are hinged on so-called goose-neck or "swing-out" hinges so that the front edge (the hinged edge) of the door is carried outwardly from the door frame during the first increment of opening movement of the door, and therefore, the condition illustrated in the left portion of Figure 2 also obtains along the front or hinged edge of the front door.

The right portion of Figure 2 shows the condition which prevails along the hinged edge of the rear door, and here the weatherstrip lip is deflected in the opposite direction to form the seal and some compression may also occur. The rear door 12 is provided with a wall 52 upon which the weatherstrip is cemented with the flange 22 extending toward the inner surface of the door. The broken line 54 indicates the swing line of the front or hinged side of the rear door, the rear door hinges being so devised that the front edge of the door is not drawn outwardly upon initial opening movement. Therefore, when the door is closed the direction of movement of the lip 20 of the weatherstrip is such that the side of said lip is brought into engagement with the side wall 36 of the door pillar rather than with the outwardly facing surface 39 of the rabbeted portion of the pillar. As the door is closed the lip is deflected toward the flange 22, and in the construction illustrated, the space between the pillar wall 36 and the side 52 of the door is such that some compression of the weatherstrip occurs, although obviously if this space were widened the seal could be made by deflection alone. Compression along the hinged edge of the door does not create the difficulties which would be created were the compression along other edges of the door because the leverage action of the door creates a mechanical force so high that a small amount of compression does not notably increase the difficulty in closing the door or the difficulty in opening the door.

The condition illustrated in the right hand portion of Figure 2 is typical of the entire front or hinged edge of the rear door. The upper and lower corners of said edge comprise "crossover" points for the weatherstrip, and along the top and bottom sides of the door and along the rear edge of the door the direction of closing of the door again is such that the weatherstrip moves toward the outwardly facing surface 39 of the rabbeted portion of the door, so that along the top and bottom of the door the condition illustrated in the left portion of Figure 2 obtains and the resilient lip of the weatherstrip is deflected by the outwardly facing surface 39.

Heretofore, because of the "crossover" points adjacent to door corners where the direction of extent of the weatherstrip changes, and because of the fact that the sealing force applied to the weatherstrip was in different directions along different portions of the door periphery, it has not been possible to use a single strip of weatherstrip material adapted to provide a seal by deflection and having a constant transverse sectional configuration throughout its entire length, and at the same time to provide high door sealing pressures. If symmetrically formed weatherstrips are used the cemented area of the undersurface of the weatherstrip in the region where leverage action occurs due to deflection of the weatherstrip is so small that the weatherstrip pulls loose if high sealing pressures are provided. With the asymmetrical weatherstrip disclosed herein a large cemented area in this critical region is provided and the weatherstrip will not pull loose in spite of the presence of high sealing pressures.

In order to provide a substantially constant sealing pressure at all points around the periphery of the door the depth of the rabbeted portion of the door frame may be varied, or as an alternative, shims may be used under the weatherstrip at points where the seal is light. It is preferred to provide uniform sealing pressure at all points by varying the depth of the rabbet rather than by the use of shims in order to avoid any break in the cemented area of the undersurface of the weatherstrip.

The weatherstrip of Figure 3 is substantially similar to the weatherstrip of Figure 2, differing only in the shape of the flexible lip 20. In Figure 3 this lip is thicker at its free end than is the lip of the weatherstrip in Figure 2 and the weatherstrip of Figure 3 may be substituted to provide higher sealing pressure.

Figure 4:
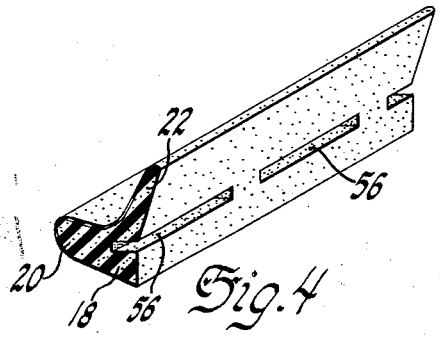
Figure 4 is a perspective view of a modified form of weatherstrip.

Figure 4 shows a modified form of weatherstrip comprising a base 18, a lip 20 and a flange 22 similar to the weatherstrips of Figures 2 and 3, but in Figure 4 the underside of the weatherstrip is provided with a slot or "core" 56 in order to make the weatherstrip easier to deflect. Obviously the weatherstrip of Figure 4 could be substituted in Figure 2 if lighter sealing pressures were desired.

While I have shown and described one embodiment of my invention, it is capable of many modifications. Changes, therefore, in the construction and arrangement may be made without departing from the spirit and scope of the invention as set forth in the appended claims.

I claim:

1. Apparatus of the character described, including: a door frame defining a door opening, said frame having side walls each formed with an outer rabbeted portion providing an outwardly facing surface; a door hingedly mounted in said opening; and an elongated weatherstrip mounted on said door and extending entirely around the periphery thereof, said weatherstrip having a substantially constant transverse sectional configuration throughout its length, and having an asymmetrical resilient lip which, when the door is closed, engages and is deflected by said outwardly facing surface throughout a major portion of the length of the weatherstrip and which engages and is deflected by at least one of said side walls inwardly of the rabbeted portion throughout a minor portion of the length of the weatherstrip, the depth of said rabbeted portion of the door frame being proportioned to provide a seal of substantially uniform pressure along substantially the entire length of said major portion of the weatherstrip.

2. Apparatus of the character described, including: a door frame defining a door opening, said frame having side walls each formed with a rabbeted portion providing an outwardly facing surface; a door hingedly mounted in said opening; and an elongated weatherstrip mounted to extend around the periphery of said door opening at least when the door is closed, said weatherstrip having a substantially constant transverse sectional configuration throughout its length and comprising a resilient base, an integral asymmetrical lip projecting from said base at one side thereof, and a tapered flange forming part of said base and projecting therefrom, one surface of said flange merging with said lip at one side thereof, and said lip, when the door is closed, engaging and being deflected by said frame, said outwardly facing surface engaging said lip.

3. Apparatus of the character described, including: a door frame defining a door opening, said frame having side walls each formed with an outer rabbeted portion providing an outwardly facing surface; a door hingedly mounted in said opening, the outer surface of said door and the outer surface of at least a portion of said frame lying in the same vertical plane; and an elongated weatherstrip mounted on said door and extending around the periphery thereof, said weatherstrip having a substantially constant transverse sectional configuration throughout its length and comprising a base portion and a resilient lip extending from said base portion, said base portion having a tapered flange, one surface of which merges into said lip, said lip, when the door is closed, engaging and being deflected by said outwardly facing surface throughout a major portion of the length of the weatherstrip and engaging and being deflected by at least one of said side walls inwardly of the rabbeted portion throughout a minor portion of the length of the weatherstrip.

4. Apparatus of the character described, including: a door frame defining a door opening, said frame having side walls each formed with an outer rabbeted portion providing an outwardly facing surface; a door hingedly mounted in said opening with its edges adjacent said side walls when the door is closed, the outer surface of said door and the outer surface of at least a portion of said frame lying in the same vertical plane; and an elongated weatherstrip mounted on the edges of said door and extending entirely around the periphery thereof, said weatherstrip having a substantially constant transverse sectional configuration throughout its length and comprising a base portion and an asymmetrical resilient lip extending from said base portion toward the inner surface of said door, said base portion having a tapered flange one surface of which merges into said lip, said lip, when the door is closed, engaging and being deflected by said outwardly facing surface throughout a major portion of the length of the weatherstrip and engaging and being deflected by at least one of said side walls inwardly of the rabbeted portion throughout a minor portion of the length of the weatherstrip, the depth of said rabbeted portion of the door frame being proportioned to provide a seal of substantially uniform pressure along substantially the entire length of said major portion of the weatherstrip.

5. Apparatus of the character described, including: a door frame defining a door opening, said frame having side walls each formed with a rabbeted portion providing an outwardly facing surface; a door hingedly mounted in said opening with its edges adjacent said side walls when the door is closed; and an elongated weatherstrip mounted on the edges of said door and extending entirely around the periphery thereof, said weatherstrip having a substantially constant transverse sectional configuration throughout its length and comprising a base portion and an asymmetrical resilient lip extending from said base portion toward the inner surface of said door, said base portion having a tapered flange one surface of which merges into said lip, said lip, when the door is closed, engaging and being deflected by said outwardly facing surface throughout a major portion of the length of the weatherstrip and engaging and being deflected by at least one of said side walls throughout a minor portion of the length of the weatherstrip, the depth of said rabbeted portion of the door frame being proportioned to provide a seal of substantially uniform pressure along substantially the entire length of said major portion of the weatherstrip, and said flange, when unstressed, projecting from said base at an angle to form a depressed center portion in the undersurface of said base.

6. Apparatus of the character described, including: a door frame defining a door opening, said frame having side walls each formed with a rabbeted portion providing an outwardly facing surface; a door hingedly mounted in said opening with its edges adjacent said side walls when the door is closed; and an elongated weatherstrip mounted on the edges of said door and extending entirely around the periphery thereof, said weatherstrip having a substantially constant transverse sectional configuration throughout its length and comprising a base portion and an asymmetrical resilient lip extending from said base portion toward the inner surface of said door, said base portion having a tapered flange one surface of which merges into said lip, said lip, when the door is closed, engaging and being deflected by said outwardly facing surface throughout a major portion of the length of the weatherstrip, the depth of said rabbeted portion of the door frame being proportioned to provide a seal of substantially uniform pressure along substantially the entire length of said major portion of the weatherstrip, and said flange, when unstressed, projecting from said base at an angle to form a depressed center portion in the undersurface of said base, the width of the flange being greater than the width of the lip.

7. A weatherstrip comprising, a resilient base portion, an integral asymmetrical lip having opposite substantially planar sides and projecting from said base portion, and a tapered deflectable flange having substantially planar sides and projecting from said base portion at one side of said lip, one side of said flange merging with said one side of said lip and the other side of said flange merging at an obtuse angle with a substantially planar side of said base portion opposite said lip, with the included angle between said one side of said flange and said one side of said lip being substantially a right angle whereby said lip leans towards said base portion in a direction towards said flange, and a force exerted against said lip in a direction to deflect said lip towards said base portion will cause the opposite side of said lip to become depressed intermediate the ends thereof.

8. A weatherstrip adapted to be mounted on a support comprising, a resilient base portion, an integral asymmetrical lip projecting from said base portion, and a tapered deflectable flange projecting from said base portion at one side of said lip, one side of said flange merging with said one side of said lip and the other side of said flange merging at an obtuse angle with a side of said base portion opposite said lip whereby the included angle between said one side of said flange and said one side of said lip is substantially a right angle, said flange being adapted to be deflected toward said lip when said weatherstrip is mounted on a support whereby said other side of said flange becomes substantially coplanar with said side of said base portion opposite said lip.

9. A weatherstrip adapted to be mounted on a support comprising, a resilient base portion, an integral asymmetrical lip projecting from said base portion, and a tapered deflectable flange projecting from said base portion at one side of said lip, one side of said flange merging with said one side of said lip and the other side of said flange merging at an obtuse angle with a side of said base portion opposite said lip whereby the included angle between said one side of said flange and said one side of said lip is substantially a right angle, said flange being adapted to be deflected towards said lip when said weatherstrip is mounted on a support whereby said other side of said flange becomes substantially coplanar with said side of said base portion opposite said lip, and a force exerted on the free end of said lip in a direction to move said side of said base portion out of coplanar relationship with said other side of said flange will be resisted by said flange.

References Cited in the file of this patent

UNITED STATES PATENTS

| | | |
|---|---|---|
| 2,116,330 | Tjaarda | May 3, 1938 |
| 2,267,433 | Tea | Dec. 23, 1941 |
| 2,612,665 | Scott | Oct. 7, 1952 |
| 2,638,642 | Spraragen | May 19, 1953 |
| 2,647,792 | Flemming | Aug. 4, 1953 |

FOREIGN PATENTS

| | | |
|---|---|---|
| 640,963 | Germany | Jan. 16, 1937 |